(12) United States Patent
Paulrud et al.

(10) Patent No.: US 12,507,666 B2
(45) Date of Patent: Dec. 30, 2025

(54) MILKING SYSTEM (71) Applicant: DELAVAL HOLDING AB, Tumba (SE)

(72) Inventors: Carl Oskar Paulrud, Tumba (SE); Martin Wiedemann, Tumba (SE)

(73) Assignee: DeLaval Holding AB, Tumba (SE)

( * ) Notice: Subject to any disclaimer, the term of this patent is extended or adjusted under 35 U.S.C. 154(b) by 147 days.

(21) Appl. No.: 18/688,141

(22) PCT Filed: Aug. 29, 2022

(86) PCT No.: PCT/SE2022/050772
§ 371 (c)(1),
(2) Date: Feb. 29, 2024

(87) PCT Pub. No.: WO2023/033699
PCT Pub. Date: Mar. 9, 2023

(65) Prior Publication Data
US 2024/0397903 A1    Dec. 5, 2024

(30) Foreign Application Priority Data

Aug. 30, 2021  (SE) .................................... 2130231-0

(51) Int. Cl.
*A01J 5/04*  (2006.01)
*A01J 5/14*  (2006.01)

(52) U.S. Cl.
CPC ................ *A01J 5/048* (2013.01); *A01J 5/14* (2013.01)

(58) Field of Classification Search
CPC ...... A01J 5/16; A01J 5/04; A01J 5/047; A01J 5/01; A01J 5/007; A01J 5/12; A01J 5/10; A01J 5/048
See application file for complete search history.

(56) References Cited

U.S. PATENT DOCUMENTS

| 3,754,532 A | 8/1973 | Troberg et al. |
| 4,011,838 A | 3/1977 | Nordegren et al. |
| (Continued) | | |

FOREIGN PATENT DOCUMENTS

| DE | 2134976 A1 | 8/1972 |
| DE | 3318221 A1 | 11/1984 |
| (Continued) | | |

OTHER PUBLICATIONS

Search Report for SE Application No. 2130231-0 mailed Apr. 6, 2022, 3 pages.

(Continued)

*Primary Examiner* — Monica L Perry
(74) *Attorney, Agent, or Firm* — NIXON & VANDERHYE (57) ABSTRACT

A milking system, including a milk line; a vacuum arrangement; a milking unit; a pulsator, configured to adjust pulsation ratio and pulsation rate of fluid pressure at two distinct levels; a receiver connected to the milk line, and also connected to the vacuum arrangement; a milk meter; and a processing device communicatively connected to the milk meter and the pulsator; the processing device is configured to, repeatedly during the milking session obtain and compare a milk flow measurement with a low milk flow limit; and, when the milk flow measurement is lower than the limit apply a low pulsation rate and a first pulsation ratio, wherein the D-phase is longer than the B-phase; or otherwise apply a high pulsation rate and a second pulsation ratio, wherein the B-phase is longer than the D-phase.

17 Claims, 4 Drawing Sheets

(56) References Cited

U.S. PATENT DOCUMENTS

| | | | |
|---|---|---|---|
| 4,572,104 A | 2/1986 | Rubino | |
| 5,080,040 A * | 1/1992 | van der Lely | A01J 5/08 |
| | | | 119/14.09 |
| 5,443,035 A | 8/1995 | Lind et al. | |
| 5,697,325 A * | 12/1997 | Gehm | A01J 5/14 |
| | | | 119/14.28 |
| 6,170,434 B1 | 1/2001 | Van Der Lely et al. | |
| 6,439,156 B1 * | 8/2002 | Fleischman | A01J 5/007 |
| | | | 119/14.47 |
| 6,494,163 B1 * | 12/2002 | Oort | A01J 5/007 |
| | | | 119/14.44 |
| 7,051,673 B2 * | 5/2006 | Brown | A01J 5/007 |
| | | | 119/14.08 |
| 7,841,296 B2 * | 11/2010 | Brown | A01J 5/007 |
| | | | 119/14.08 |
| 9,326,481 B2 | 5/2016 | Wartenhorst | |
| 10,791,700 B2 * | 10/2020 | Van Dorp | A01J 5/16 |
| 10,993,410 B2 * | 5/2021 | Gehm | A01J 5/0175 |
| 2003/0145794 A1 | 8/2003 | Van Der Lely et al. | |
| 2005/0072362 A1 * | 4/2005 | Innings | A01J 5/007 |
| | | | 119/14.08 |
| 2005/0274326 A1 * | 12/2005 | Stellnert | A01J 5/048 |
| | | | 119/14.08 |
| 2012/0180728 A1 * | 7/2012 | Wartenhorst | A01J 5/048 |
| | | | 119/14.08 |
| 2021/0360892 A1 * | 11/2021 | Wallace | A01J 5/047 |
| 2024/0397903 A1 * | 12/2024 | Paulrud | A01J 5/14 |

FOREIGN PATENT DOCUMENTS

| | | | |
|---|---|---|---|
| DE | 229295 A1 | 11/1985 | |
| DE | 4406741 A1 | 9/1995 | |
| DE | 19505577 A1 | 8/1996 | |
| DE | 102006056185 A1 | 5/2007 | |
| EP | 0727137 A1 | 8/1996 | |
| WO | WO-2018017409 A2 * | 1/2018 | A01J 5/14 |

OTHER PUBLICATIONS

International Search Report for PCT/SE2022/050772 mailed Nov. 18, 2022, 3 pages.
Written Opinion of the ISA for PCT/SE2022/050772 mailed Nov. 18, 2022, 8 pages.

* cited by examiner

MILKING SYSTEM

This application is the U.S. national phase of International Application No. PCT/SE2022/050772 filed Aug. 29, 2022 which designated the U.S. and claims priority to SE Patent Application No. 2130231-0 filed Aug. 30, 2021, the entire contents of each of which are hereby incorporated by reference.

The invention refers to a milking system according to claim 1.

On a dairy farm, milk is sometimes extracted from the animal while the animal is standing on a rotary platform. The animal is allowed to enter the rotary platform at an entrance where the teats are cleaned and teat cups are attached to the teats. While the rotary platform is rotating one rotation, milking is performed. The teat cups are then detached and the animal is allowed to leave the platform.

The teat cups are often manually attached by a farmer, after having cleaned the teats, a process he/she has to perform in some few seconds. It is known that milk release of alveoli milk will occur about 40-90 seconds (with large individual differences between animals and additionally depending on various other parameters such as level of prestimulation, time of the year, feeding program, etc.) after a first stimulation of the teats (when the animal is a cow). That means the animal will rotate with the platform and be exposed for milking vacuum under the teats for about 40-90 seconds before alveoli milk is released from the teats, which may cause tissue injury on the teats due to exposure of excessive milking vacuum.

Alternatively, the farmer will have to wait for about 40-90 seconds after the first teat stimulation/cleaning before attaching the teat cups, or manually prestimulate the teats for this period, both which however are rather inconvenient.

An occurring problem is that the time it takes for the rotating platform to complete one rotation may not be enough for completing the milk evacuation from the animal, due to the long time it takes until alveoli milk is released as a result of the non-satisfying prestimulation of the teat. Retarding the rotational speed of the platform may solve this issue to some extent; however, the total milk yield of the farm will thereby decrease.

It is an object of the present invention to evolve a concept for improved milk evacuation in terms of time and efficiency, in particularly in association with rotary platforms, while ensuring and/or enhancing satisfying teat integrity.

This object is achieved by a milking system according to claim 1. The inventive milking system aims at adjusting pulsation ratio and pulsation rate of fluid pressure at at least two distinct levels, depending on the milk flow of the animal.

The milking system comprises various components, such as a milk line and a vacuum arrangement, in turn comprising a vacuum pump. The milking system also comprises a milking unit with a plurality (four in case the animal is a cow) of teat cups, each configured to fit on a respective teat of an animal during milk extraction in a milking session, wherein the milking unit is connected to the milk line via a milk conduit. Each teat cup comprises a respective liner and a shell, forming a pulsation space between the liner and the shell.

The milking system also comprises an electronically controlled pulsator. The pulsator is configured to adjust pulsation ratio and pulsation rate of fluid pressure at two distinct levels, alternatively provided to the respective pulsation space of each teat cup of the milking unit. Thereby the pulsator causes the respective liner to alternate between a B-phase wherein the liner is opened, and milk may be extracted from the teat during the milking session, and a D-phase wherein the liner is collapsed and is acting compressively against the teat.

In addition, the milking system comprises a receiver in which a system vacuum prevails, connected to the milk line, and also connected to the vacuum arrangement.

The milking system also comprises a milk meter arranged in the milk conduit between the milking unit and the milk line, wherein the milk meter is configured to measure the milk flow per time unit of milk ejected from the animal via the milking unit during the milking session.

Furthermore, the milking system comprises a processing device. The processing device is communicatively connected to the milk meter and the electronically controlled pulsator. The processing device is configured to, repeatedly during the milking session, obtain a milk flow measurement from the milk meter, and to compare the obtained milk flow measurement with a low milk flow limit. The low milk flow limit may be within an interval of about 250-500 g/minute, preferably about 400 g/minute, in some embodiments.

The processing device is configured to generate a command to a pulsator of the system, to apply a low pulsation rate, and to apply a first pulsation ratio, wherein a D-phase (i.e. when a teat cup liner is collapsed and is acting compressively against the teat) is longer than a B-phase (wherein the teat cup liner is opened, and milk may be extracted from the teat), when the milk flow measurement is lower than the low milk flow limit. The processing device is also configured to generate a command to the pulsator, to apply a high pulsation rate, and to apply a second pulsation ratio, wherein the B-phase is longer than the D-phase, and wherein the second pulsation rate is larger than the first pulsation rate when the milk flow measurement exceeds the low milk flow limit.

The low pulsation rate may in some embodiments be within an interval of 40-59 pulsations per minute, preferably about 50 pulsations per minute, and the first pulsation ratio between the B-phase/the D-phase may be in an interval of about 25/75-45/55, preferably about 30/70.

The high pulsation rate may in some embodiments be within an interval of 55-90 pulsations per minute, preferably about 60 pulsations per minute, and the second pulsation ratio between the B-phase/the D-phase may be in an interval of about 55/45-64/36, preferably about 60/40.

By applying a pulsation ratio with a longer D-phase than the B-phase, at a slow pulsation rate, right after attachment of the teat cups onto the teats before alveoli milk release, the teats are massaged by the rhythmical motions of the liner, which are opened and closed by the pulsation vacuum at the slow pulsation rate.

Thereby, an early alveoli milk release of the animal is stimulated, while teat integrity is maintained.

When the milk flow of the animal is exceeding the low milk flow limit, the high pulsation rate and longer B-phase ratio may be safely applied to teats. A complete udder emptying of the animal during a rotation of a rotational platform could thereby be ascertained, when the milking system comprises such rotational platform. Possibly, the rotational speed may be increased, thereby allowing an increased throughput of animals leading to an increased milk yield at the farm.

In embodiments of the milking system, the processing controller may be configured to, when the milk flow measurement exceeds the low milk flow limit, apply a latency period before making any changes in pulsation ratio and/or pulsation rate of the pulsator. It is thereby ensured that substantially all milk flow measurements obtained during the latency period exceeds the low milk flow limit before generating the commands to the pulsator to apply the high pulsation rate and to apply the second pulsation ratio.

By applying the latency period, for example about 10-20 seconds, a sudden spike in milk flow, or some singular/isolated milk flow measurements does not trigger an increase pulsation rate and pulsation ratio, unless a consistently increased milk flow over the low milk flow limit is performed. Teat integrity is thereby additionally enhanced.

Also, the milking system may comprise a controllable valve, arranged in the milk conduit, connected to the milking unit via the milk conduit and to the milk line in some embodiments. The controllable valve comprises an adjustable passage wherein fluid pressure of the milk line is provided to the milk conduit via the adjustable passage, wherein an adjustment of the adjustable passage results in an adjustment of the fluid pressure in the milk conduit upstream the controllable valve.

The expression "upstream" in the current context refers to the milk flow direction during milk extraction in the milking session, from the teat cups, via the milk conduit to the milk line and the receiver.

A convenient yet reliable and robust adjustment of the vacuum pressure applied to the milk conduit, and thereby also the vacuum pressure applied on the teats in the teat cups.

The milking system may comprise a vacuum pressure sensor, arranged to measure pressure level in the milk conduit upstream the controllable valve.

The vacuum pressure upstream the controllable valve, in the milk conduit could thus be measured by the vacuum pressure sensor and a control may be made, for example, whether a desired vacuum pressure of the milk conduit has been achieved.

The processing device of the milking system may be communicatively connected to the controllable valve. The processing device may also be configured to compare the obtained milk flow measurement with a high milk flow limit. The high milk flow limit may be within an interval of about 1 000-3 000 g/minute, preferably about 1 500 g/minute. Also, the processing device may be configured to generate and provide a control signal to the controllable valve, to adjust the adjustable passage in order to provide a fluid pressure at a low vacuum level, to the milk conduit, when the obtained milk flow measurement is lower than the high milk flow limit. The processing device may furthermore be configured to alternatively adjust the adjustable passage in order to provide a fluid pressure at a high vacuum level, to the milk conduit, when the obtained milk flow measurement exceeds the high milk flow limit.

By applying a high vacuum level when the milk flow is high, i.e. over the threshold limit, more milk is extracted per time unit, resulting in a shorter parlour occupancy time. Yet teat integrity is assured, because the high vacuum is only supplied upstream the controllable valve when the milk flow exceeds the high milk flow limit.

The vacuum arrangement comprised in the milking system may comprise a high vacuum line, wherein the high vacuum level prevails, and a low vacuum line, wherein the low vacuum level prevails. The vacuum arrangement may be connected to the controllable valve. Furthermore, the processing device may be configured to generate and provide a control signal to a regulator, to supply fluid pressure of the low vacuum level from the low vacuum line to a dry side of the controllable valve. The control signal is thereby acting on a flexible membrane which in turn adjusts the adjustable passage of the controllable valve, such that fluid pressure at the low vacuum level is provided upstream the controllable valve to the milk conduit, when the obtained milk flow measurement is lower than the high milk flow limit.

The processing device may also be configured to alternatively generate and provide a control signal to the regulator, to supply fluid pressure of the high vacuum level from the high vacuum line to the to the dry side of the controllable valve. The control signal is thereby acting on the flexible membrane which in turn adjusts the adjustable passage of the controllable valve, such that fluid pressure at the high vacuum level is provided upstream the controllable valve to the milk conduit when the obtained milk flow measurement exceeds the high milk flow limit.

The high vacuum level may be within an interval of 45-55 kPa, preferably about 49 kPa; and the low vacuum level may be within an interval of 34-44 kPa, preferably about 40 kPa, in some embodiments.

By adjusting the vacuum pressure of the milk conduit, as provided by the receiver, by providing fluid pressure of high/low vacuum level from separate respective vacuum lines, a robust and reliable solution for adjusting the milk conduit vacuum pressure is achieved.

In some embodiments of the milking system, the processing device may be configured to, when the milk flow measurement exceeds the high milk flow limit, generate a command to the pulsator, to apply a third pulsation ratio instead of the second pulsation ratio, wherein the B-phase of the third pulsation ratio is longer than the B-phase of the second pulsation ratio.

The third pulsation ratio between the B-phase/the D-phase may be within an interval of about 65/35-70/30, preferably about 65/35.

By once again extending the B-phase when the milk flow of the animal is high, exceeding the high milk flow limit, the milking time is decreased as more milk is extracted per time unit, resulting in a shorter parlour occupancy time.

The processing device of the milking system may be communicatively connected to the vacuum pressure sensor in some embodiments. The processing device may be configured to obtain a sequence of pressure level measurements from the vacuum pressure sensor during a predetermined time period. Also, the processing device may be configured to compare each pressure level measurement during the predetermined time period with a pressure threshold limit. The processing device may additionally be configured to, when all pressure level measurements during the predetermined time period exceeds the pressure threshold limit generate a command to output an alert on an output device, related to the milking unit.

It is thereby assured that the high pressure level is not applied longer than the predetermined time period. Hereby, it can be detected if there is something wrong with the vacuum regulation and assure that the high vacuum level is not supplied upstream the controllable valve during the whole milking session. The reason for the alarm might be that a valve or a vacuum regulation block or similar is not working properly and consequently, the vacuum regulation fails.

To generate an alert when the high pressure level is provided for longer than the predetermined time is a safety measure, safeguarding the animal teats from excessive and harmful vacuum.

The predetermined time period may correspond to an estimated maximum time period the animal may generate a milk flow exceeding the high milk flow limit.

By setting the predetermined time period to about the maximum time period the animal may be expected to have a very high milk flow, exceeding the high milk flow limit, it is assured that an alert is generated as shortly as possible after a potential system failure wherein the high vacuum level is provided to the milking conduit, yet it is avoided that unnecessary alerts are generated.

The milking system may also comprise a rotary platform in some embodiments, which rotary platform may comprise a plurality of milking units, each attached to the milk line.

A rotary platform is efficiently extracting milk from animals of a large herd. The provided solution is in particular advantageous in milking systems comprising a rotary platform.

However, the invention can be implemented to any milking parlour configuration such as a conventional stationary milking parlour or a stanchion milking parlour but also to robotic milking system.

Hereby, a time efficient, yet teat friendly milk extraction is provided.

Other advantages and additional novel features will become apparent from the subsequent detailed description.

FIGURES

Embodiments of the invention will now be described in further detail with reference to the accompanying figures, in which.

DETAILED DESCRIPTION

Embodiments of the invention described herein are defined as a milking system, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
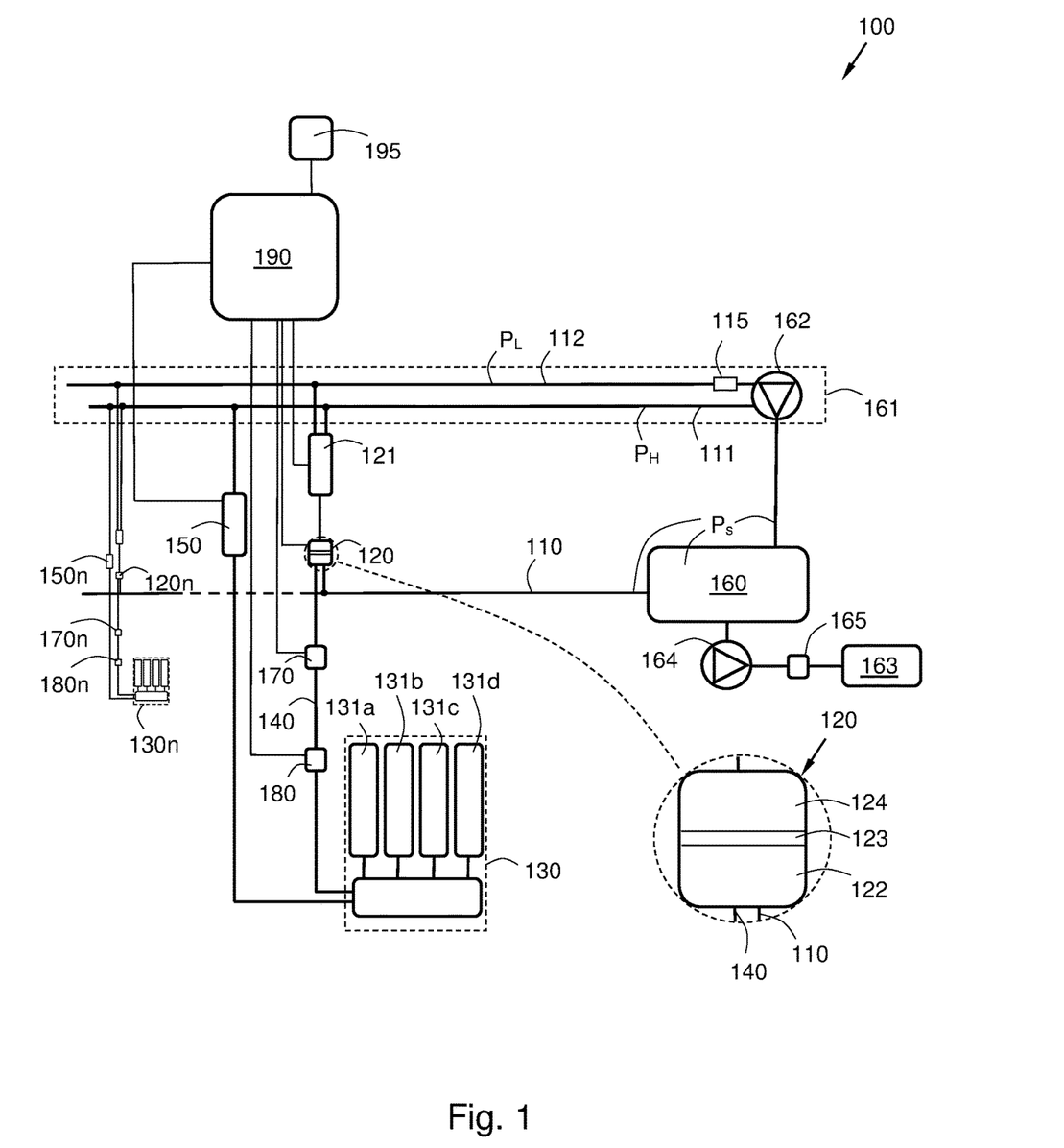
FIG. 1 illustrates a milking system according to an embodiment.

FIG. 1 illustrates a milking system 100 configured to extract milk from an animal during a milking session. The animal may be comprised in a herd of animals for dairy farming at a farm. The milking system 100 may with advantage, although not necessarily, be implemented in an agricultural environment comprising one or several rotary platforms.

"Animal" may be any arbitrary type of domesticated female mammal such as e.g. cow, goat, sheep, camel, horse, dairy buffalo, donkey, yak, etc. (non-exhaustive list of animals). The animal may have four teats, as for example cows, or two teats, such as for example goats and/or sheep. Other animals may have other numbers of teats.

The milking system 100 comprises a plurality of milking units 130, each comprising a number of teat cups 131a, 131b, 131c, 131d. The number of teat cups 131a, 131b, 131c, 131d is typically identical with the number of teats of the animal to be milked within the milking system 100. Each teat cup 131a, 131b, 131c, 131d is configured to fit on a respective teat of the animal and to be attached thereto during milk extraction in the milking session.

Each teat cup 131a, 131b, 131c, 131d comprises a respective liner and a shell, forming a pulsation space between the liner and the shell.

The milking unit 130 is connected to a milk line 110, leading extracted milk from the respective udder, via a milk conduit 140 and the milk line 110 to a receiver 160. The receiver 160 is in turn connected to a vacuum arrangement 161, comprising one or several vacuum pumps 162. The several vacuum pump 162 has generated and/or continuously generates a system vacuum pressure $P_s$ supplied to the receiver 160 and the milk line 110.

The system vacuum pressure $P_s$ may be for example somewhere between about 45-55 kPa (arbitrary, non-limiting examples), such as for example about 49 kPa. The system vacuum pressure $P_s$ may be maintained substantially constant over time in the receiver 160 during the majority time of the milking session.

The expressions "vacuum pressure" and/or "milking vacuum" and/or "system vacuum pressure" respectively, refers to under-pressure/lower pressure in comparison with the environmental atmospheric pressure. A vacuum pressure level of 10 kPa thus means a vacuum pressure level which is 10 kPa lower than the environmental atmospheric pressure.

The receiver 160 may collect milk extracted during the milking session, which may be forwarded via a pump arrangement 164, tubing and possibly an optional filter 165, to a connected cooling tank 163 where the milk may be collected and maintained at chilled temperature until being emptied when the milk truck arrives to the farm.

The milking system 100 also comprises an electronically controlled pulsator 150. The electronically controlled pulsator 150 is configured to adjust pulsation ratio and pulsation rate of fluid pressure at two distinct levels, alternatively provided to the respective pulsation space of each teat cup 131a, 131b, 131c, 131d of the milking unit 130, thereby causing the respective liner to alternate between a B-phase wherein the liner is opened, and milk may be extracted from the teat during the milking session, and a D-phase wherein the liner is collapsed and is acting compressively against the animal teat.

In addition, the milking system 100 comprises a milk meter 170. The milk meter 170 may be realised as a flow indicator, i.e. a less precise instrument, yet roughly indicative, for estimating milk flow. The milk meter 170 may be arranged in the milk conduit 140 between the milking unit 130 and the milk line 110, or in another appropriate position. The milk meter 170 is configured to measure the milk flow per time unit of milk ejected from the animal via the milking unit 130 during the milking session. The measurements may be made repeatedly/continuously at a predetermined time interval for monitoring the milk flow of the animal. Alternatively, the milk meter 170 may make a milk flow measurement upon reception of a command from a processing device 190 of the milking system 100.

The processing device 190 is communicatively connected to the milk meter 170 and the electronically controlled pulsator 150, for instance via a wireless connection based on radio or optical technique, or a wired connection implemented by electric cable or optic fibre.

The processing device 190 is configured to obtain a milk flow measurement from the milk meter 170, repeatedly during the milking session. The obtained milk flow measurement may be repeatedly compared with a predetermined low milk flow limit. The low milk flow limit may be set to a value within an interval of about 250-500 g/minute, such as for example about 400 g/minute (udder milking).

When the comparison results in that the milk flow measurement is lower than the low milk flow limit, the processing device 190 is configured to generate a command to the pulsator 150 to apply a low pulsation rate. The low pulsation rate may be set to a value within an interval of about 40-59 pulsations per minute, such as for example about, preferably about 50 pulsations per minute.

Also, the processing device 190 is configured to generate a command to the pulsator 150 to apply a first pulsation ratio, wherein the D-phase is longer than the B-phase. The first pulsation ratio between the B-phase/the D-phase may be set to about 30/70, or within an interval of about 25/75-45/55, respectively.

The processing device 190 is also configured to, when the milk flow measurement exceeds the low milk flow limit, generate a command to the pulsator 150 to apply a high pulsation rate. The high pulsation rate may be set to a value within an interval of about 55-90 pulsations per minute, such as for example about 60 pulsations per minute.

Also, the processing device 190 is configured to generate a command to the pulsator 150 to apply a second pulsation ratio, wherein the B-phase is longer than the D-phase. The second pulsation ratio between the B-phase/the D-phase may be set to about 60/40 in some embodiments, or within an interval of about 55/45-64/36, respectively.

The processing device 190 may in addition be configured to apply a latency period and ensuring that all milk flow measurements obtained during the latency period exceeds the low milk flow limit before generating the commands to the pulsator 150 to apply the high pulsation rate and to apply the second pulsation ratio, when the milk flow measurement exceeds the low milk flow limit.

The latency period may be set to a predetermined value within an interval of about 5-40 seconds, such as for example 10-20 seconds. The latency period may be set to for example about 15 seconds in some embodiments.

The milking system 100 may also comprise a valve device 120 i.e. a controllable valve, and a regulator 121, which may be communicatively connected to the processing device 190. The vacuum regulator 121 may be operating in conjunction with the controllable valve 120, in some embodiments, as schematically illustrated in FIG. 1.

The valve device 120 may be associated with adjustment of an inlet vacuum pressure level $P_L$, $P_H$ provided to the milk conduit 140 and thereby also to the teat cups 131a, 131b, 131c, 131d. The controllable valve 120 may comprise an adjustable passage 122, or wet section as it also may be called. The controllable valve 120 may also comprise a dry section 124, separated from the adjustable passage 122 by a flexible membrane 123.

By regulating the adjustable passage 122 in a controlled manner, the vacuum pressure level supplied to the milk conduit 140 upstream the controllable valve 120 is correspondingly adjusted.

The controllable valve 120 may as schematically illustrated in FIG. 1 constitute part of the transportation of milk from the milk conduit 140 to the milk line 110, which in turn forwards the extracted milk to the receiver 160.

The vacuum pressure level provided to the milk conduit 140 upstream controllable valve 120 may thus be adjusted via the adjustable passage 122. A control vacuum level provided to the dry section 124 may adjust the size of the adjustable passage 122 by acting on the flexible membrane 123, which in turn adjusts the passage 122, thereby causing a controllable drop in pressure when the control vacuum at the low vacuum level $P_L$ of the low vacuum line 112 is provided to the dry section 124 of the controllable valve 120.

The control vacuum level or the pressure provided to the dry section 124 of the controllable valve 120 may sometimes also be referred to as pilot vacuum level.

The pilot vacuum level provided to the controllable valve 120 may be monitored during a milking session in some embodiments, i.e. the vacuum level of the dry section 124 of the controllable valve 120 may be monitored/repeatedly measured during the milking session.

It is to be noted that the level of the pilot vacuum substantially corresponds to the vacuum level prevailing upstream the controllable valve in the milk conduit 140 of the milking unit 130. This condition prevails when the system vacuum prevails in the receiver. Hereby, it can be detected if there is something wrong with the vacuum regulation, for example if the high vacuum level is prevailing during the whole milking session, an alert is activated. The reason for the alert might be that the controllable valve 120 or the vacuum regulation is not working properly.

The controllable valve 120 comprising the flexible membrane 123 may for example, but not necessarily, be referred to as a shut-off valve.

In other alternative embodiments, the controllable valve 120 and the therein comprised adjustable passage 122 may be adjustable by an electric control signal provided by the processing device 190.

The processing device 190 may be configured to compare the obtained milk flow measurement with a high milk flow limit. The high milk flow limit may be predetermined and set to a value within an interval of about 1 000-3 000 g/minute, preferably about 1 500 g/minute (udder milking).

The processing device 190 may also be configured to generate and provide a control signal to the controllable valve 120, to adjust the adjustable passage 122 in order to provide a fluid pressure at a low vacuum level $P_L$ upstream the controllable valve 120, to the milk conduit 140, when the obtained milk flow measurement is lower than the high milk flow limit $MF_H$. The processing device 190 may also be configured to, alternatively, adjust the adjustable passage 122 in order to provide a fluid pressure at a high vacuum level $P_H$ upstream the controllable valve 120, to the milk conduit 140, when the obtained milk flow measurement exceeds the high milk flow limit $MF_H$.

The high vacuum level $P_H$ may be within an interval of 45-55 kPa, such as for example about 49 kPa, when the animal is a cow. The low vacuum level $P_L$ may be within an interval of 34-44 kPa, such as for example about 40 kPa, for a cow.

In some embodiments, the processing device 190 may in addition be configured to generate a command to the pulsator 150 to apply a third pulsation ratio instead of the second pulsation ratio, wherein the B-phase of the third pulsation ratio is longer than the B-phase of the second pulsation ratio, when the milk flow measurement exceeds the high milk flow limit.

The third pulsation ratio between the B-phase/the D-phase may be set to about 65/35, 70/30.

The previously mentioned vacuum arrangement 161 may in some embodiments comprise a high vacuum line 111, wherein the high vacuum level $P_H$ prevails, and a low vacuum line 112, wherein the low vacuum level $P_L$ prevails.

The processing device 190, which may be communicatively connected to the regulator 121, may be configured to generate and provide a control signal to the regulator 121, to supply fluid pressure of the low vacuum level $P_L$ from the low vacuum line 112 to the dry side 124 of the controllable valve 120. Thereby, the fluid pressure of the control signal will be acting on the flexible membrane 123 which in turn adjusts the adjustable passage 122 of the controllable valve 120, such that fluid pressure at the low vacuum level $P_L$ is provided to the milk conduit 140 upstream the controllable valve 120 at the low vacuum level $P_L$, to the milk conduit 140, when the obtained milk flow measurement is lower than the high milk flow limit.

However, in the opposite case, when the obtained milk flow measurement exceeds the high milk flow limit, the processing device 190 may be configured to generate and provide a control signal to the regulator 121, to supply fluid pressure of the high vacuum level $P_H$ from the high vacuum line 111 to the to the dry side 124 of the controllable valve 120 thereby enabling supply of fluid pressure at the high vacuum level $P_H$, to the milk conduit 140 upstream the controllable valve 120.

In addition, the milking system 100 may comprise a vacuum pressure sensor 180, communicatively connected to the processing device 190. The vacuum pressure sensor 180 may be associated with the milk conduit 140 of the milking unit 130 and arranged to measure the pressure level in the milk conduit 140 upstream the controllable valve 120. However, in some alternative embodiments, the vacuum pressure sensor 180 may be arranged for example on the dry side 124 of the controllable valve 120, or at/in the milking unit 130.

The vacuum pressure measured by the vacuum pressure sensor 180 is measures or is at least indicative of the vacuum pressure level prevailing in the teat cups 131a, 131b, 131c, 131d under the animal teats.

The vacuum pressure in the milk conduit 140 may be measured repeatedly during the milking session by the vacuum pressure sensor 180 and be provided to the processing device 190.

The processing device 190 may be configured to obtain a sequence of pressure level measurements from the vacuum pressure sensor 180 during a predetermined time period.

The predetermined time period may be set to an approximate time value period which corresponds to an estimated maximum time period the animal may generate a milk flow exceeding the high milk flow limit, for example about 1 to 5 minutes.

In addition, the processing device 190 may be configured to compare each pressure level measurement during the predetermined time period with a predetermined pressure threshold limit. The predetermined pressure threshold limit may be identical with the high vacuum level $P_H$/system vacuum level $P_S$.

The processing device 190 may also be configured to, when all pressure level measurements performed during the predetermined time period exceeds the pressure threshold limit, to generate a command to output an alert on an output device, related to the milking unit 130.

The milking system 100 may furthermore comprise a database 195 in some embodiments, communicatively connected to the processing device 190. The optional database 195 may be configured to store data, for example related to various vacuum pressure levels, such as for example the low milk flow limit, the high milk flow limit, the high vacuum level $P_H$, the low vacuum level $P_L$, the predetermined pressure threshold limit, the predetermined time period, the estimated maximum time period the animal may generate a milk flow exceeding the high milk flow limit, the first/second/third pulsation ratios between the B-phase/the D-phase, length of the latency period, and/or the high/low pulsation rates.

The milking session of the animal may be regarded as beginning when a pre-treatment is performed on the first teat of the animal, which starts stimulation of oxytocin release of the animal. The pre-treatment may comprise cleaning of the teat, for example by rinsing the teat with water, treating the teat with a brush/piece of cloth, or otherwise teasing/stimulating the teat.

Alternatively, the milking session may be considered to begin when the first teat cup 131a, 131b, 131c, 131d is attached to the first teat.

Figure 2:
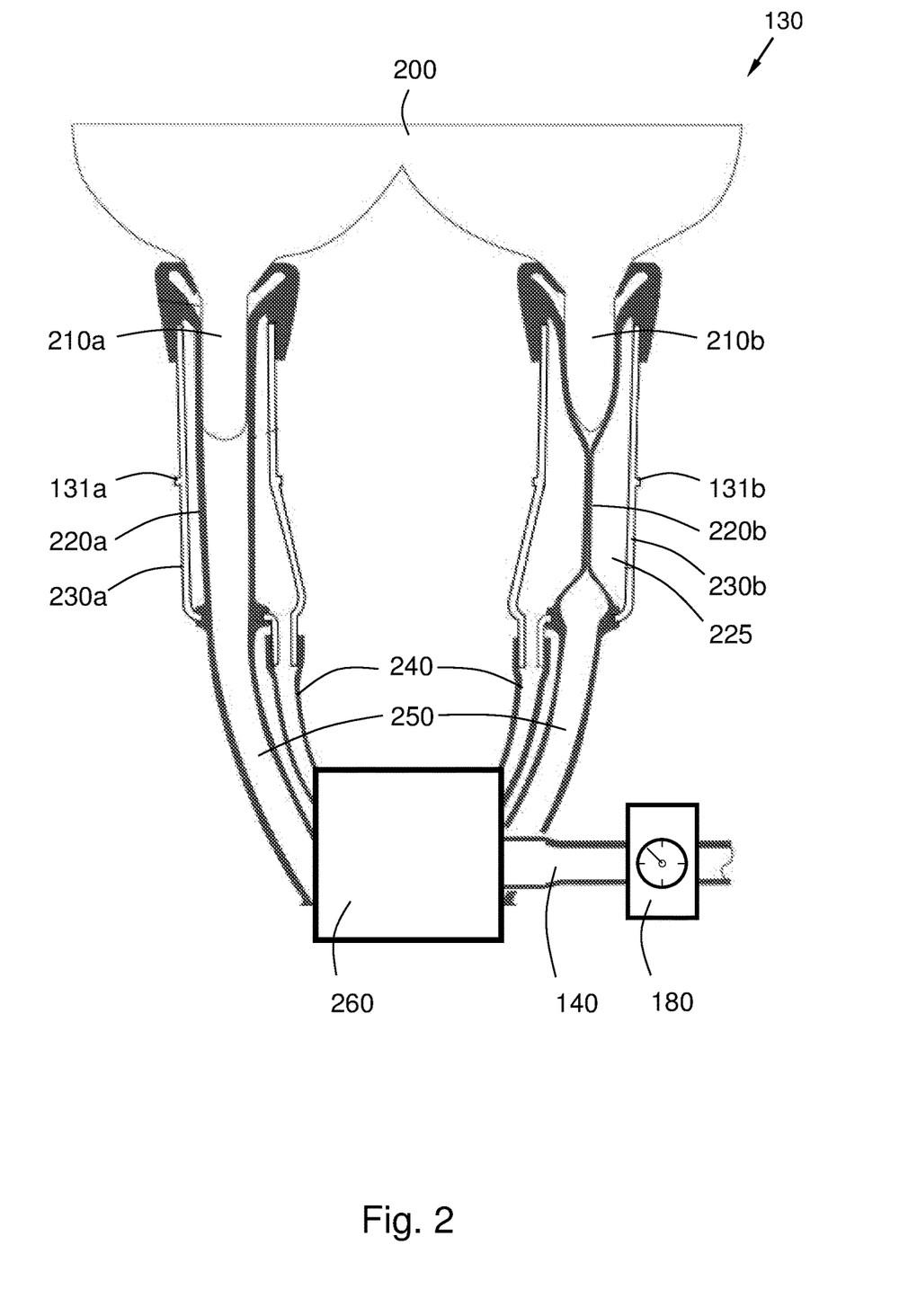
FIG. 2 conceptually illustrates teat cups and liners in B-phase and D-phase, respectively, and other parts of the milking system.

FIG. 2 schematically illustrates animal teats 210a, 210b of an animal 200, and a milking unit 130 comprising a plurality of teat cups 131a, 131b, 131c, 131d, for example four teat cups 131a, 131b, 131c, 131d when the animal 200 is a cow.

Each of the teat cups 131a, 131b, 131c, 131d comprises a shell 230a, 230b, a flexible liner 220a, 220b, a short pulse tube 240 and a short milk tube 250. The respective liner 220a, 220b and shell 230a, 230b of each teat cup 131a, 131b, 131c, 131d forms a pulsation space 225 between the liner 220a, 220b and the shell 230a, 230b.

The milking unit 130 may also comprise a claw 260, a milk conduit 140 and a long pulse tube, connected to the pulsator 150.

The liner 220a, 220b is made of rubber, silicon, thermoplastic elastomer (TPE), or other similar flexible material and comprises a head with a mouthpiece, wherein the teat 210a, 210b is allowed to enter the teat cup 131a, 131b, 131c, 131d at the beginning of a milking session. The liner 220a, 220b is the only part of the milking unit 130 which is in direct contact with the teat 210a, 210b. The liner 220a, 220b is designed to fit the teat 210a, 210b to minimise liner slip and cluster fall off.

The teat cup shells 230a, 230b may be made from a rigid/non-elastic material such as stainless steel or another metal; or possibly by a plastic polymer.

If a constant sucking would be applied to the teat 210a, 210b, blood and lymph would be accumulated in the teat 210a, 210b. Therefore, the milking system 100 comprises the electronically controlled pulsator 150, for enabling opening and closing of the liner 220a, 220b so that sucking is interrupted by rhythmical motions. Consequently, the teats 210a, 210b are exposed to massage and congestion in the teat end is prevented.

As illustrated in FIG. 2, in the left teat cup 131a, the liner 220a is open, i.e. in B-phase while in the right teat cup 131b, the liner 220b has collapsed under the teat 210b i.e. in D-phase. This is merely an illustration of general principles.

A pulsation cycle can be divided in four different phases A, B, C, and D. During phase A, the opening phase, the liner 220a, 220b starts to open, thereby allowing/enabling milk flowing from the teat 210a, 210b. During phase B, the milking phase, the milk is continuously enabled to flow. The following phase C, the teat cup liner 220a, 220b starts to close and milk is prevented from flowing from the teat 210a, 210b. The last phase, D, the massage phase or resting phase, the liner 220a, 220b is closed and a force is exerted by the collapsed liner 220a, 220b in the D-phase onto the teat.

By applying a pulsation ratio wherein the D-phase is longer than the B-phase, the teats 210a, 210b are gently massaged and stimulated by the liner 220a, 220b when the milk flow is low, i.e. below the low milk flow limit, which will influence udder health while eliminating or at least reducing the risk of exposing the teats 210a, 210b for an excessive vacuum pressure when the milk flow is low in the beginning of the milking session.

When milk has started to flow from the teats 210a, 210b, i.e. when the milk flow exceeds the low milk flow limit, a shift is made in pulsation ratio, so that a second pulsation ratio between the B-phase/the D-phase is applied to the teats 210a, 210b, wherein the B-phase is longer than the D-phase.

Thanks to the longer D-phase at the beginning of the milking session a thorough stimulation of the teat is provided which ensure good release of Oxytocin and an efficient milk extraction of the animal 200 is promoted, thereby shortening the time it takes to finish the milking session of the animal 200.

Figure 3:
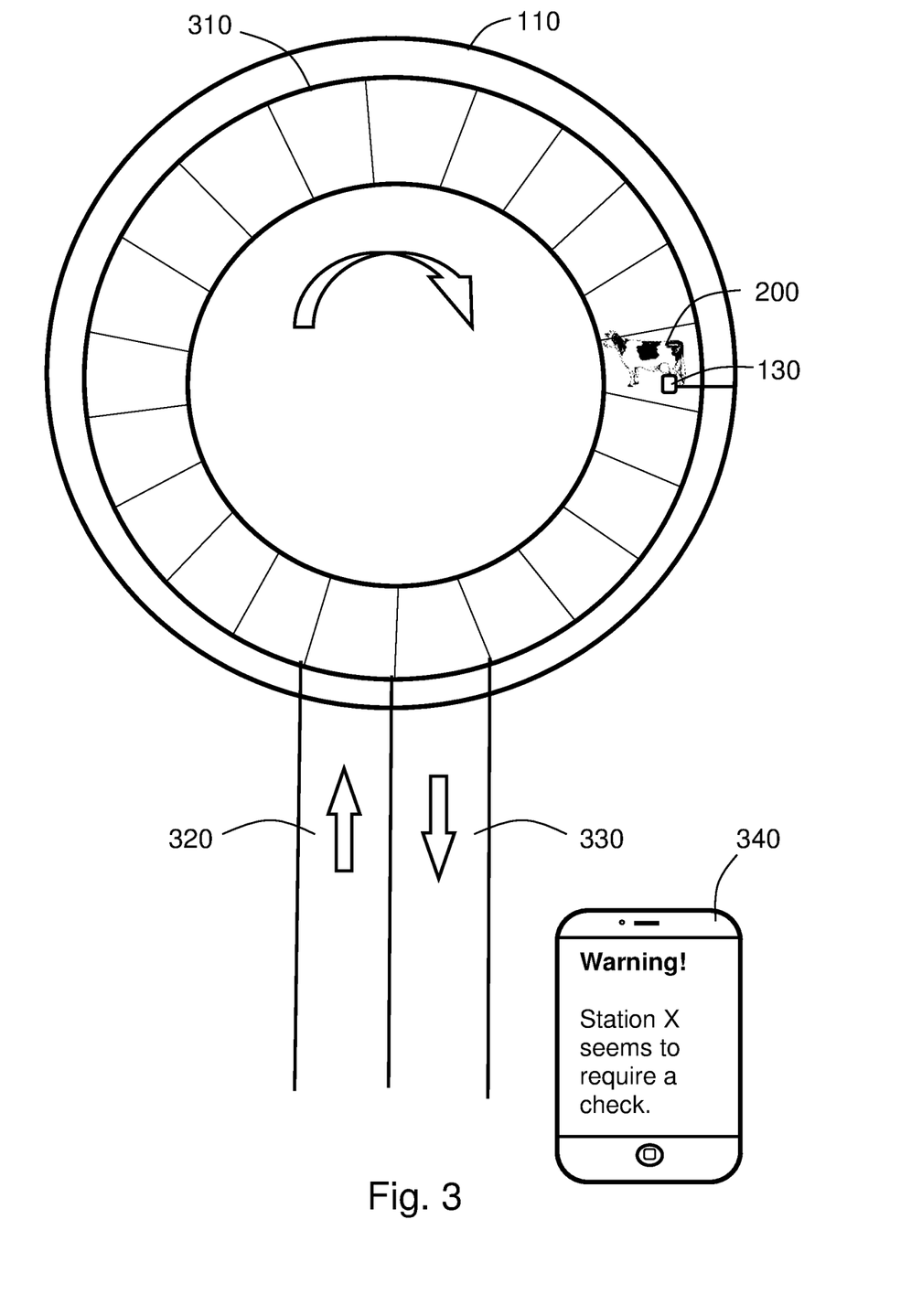
FIG. 3 is a conceptual illustration depicting principles of a milking system according to an embodiment comprising a rotary platform.

FIG. 3 illustrates a scenario wherein the inventive solution is implemented, comprising a rotary platform 310.

The animals 200 are directed to the rotary platform 310 via an entrance path 320 leading the animals 200 onto the rotary platform 310. Platform rotation may move the animal 200 to a position of an operator. The operator may then perform cleaning of the teats 210a, 210b and attach the milking unit 130 to the animal udder. After milking, the animal 200 exits the rotary platform 310 via an exit path 330, direction the animal 200 away from the rotary platform 310. Animals 200 may constantly be entering and exiting the rotary platform 310, via the respective entrance/exit paths 320, 330. This continuous flow of animals is the main contributor to the high efficiency in terms of animal throughput. Often the rotating platform 310 rotates at a constant speed.

Rotary parlours are labour efficient and provides a high cow throughput per hour.

The size of the rotary platform 310 may be different in different implementations, but may for example have between about 30-150 stalls, allowing the same number of animals 200 to simultaneously be milked on the rotary platform 310. The rotational speed of the rotary platform 310 may be adapted to the estimated time it takes for an animal 200 to complete the milking session. This estimated time may be different for different individual animals 200. The estimated time for completing the milking may also be different based on the animal breed, time of year, animal lactation, feeding regime, etc.

However, the time-efficient milk evacuation due to the invention enables an increase of the rotational speed of the rotary platform 310 and thereby also of the throughput of cows per time unit, in relation to previously known methods.

In some embodiments, a malfunction in a component of the milking system 100 that results in that animal teats 210a, 210b are exposed to excess vacuum pressure may be detected.

The vacuum pressure sensor 180 is arranged to measure the pressure level in the milk conduit 140 upstream the controllable valve 120. The processing device 190, which may be communicatively connected to the vacuum pressure sensor 180, may be configured to obtain a sequence of pressure level measurements from the vacuum pressure sensor 180 during a predetermined time period. Also, the processing device 190 may be configured to compare each pressure level measurement during the predetermined time period with a pressure threshold limit; and, when all pressure level measurements during the predetermined time period exceeds the pressure threshold limit, generate a command to output an alert on an output device 340, related to the milking unit 130.

The operator or the farmer is thereby informed about the malfunctioning and may check the functionality of the milking system 100.

Figure 4:
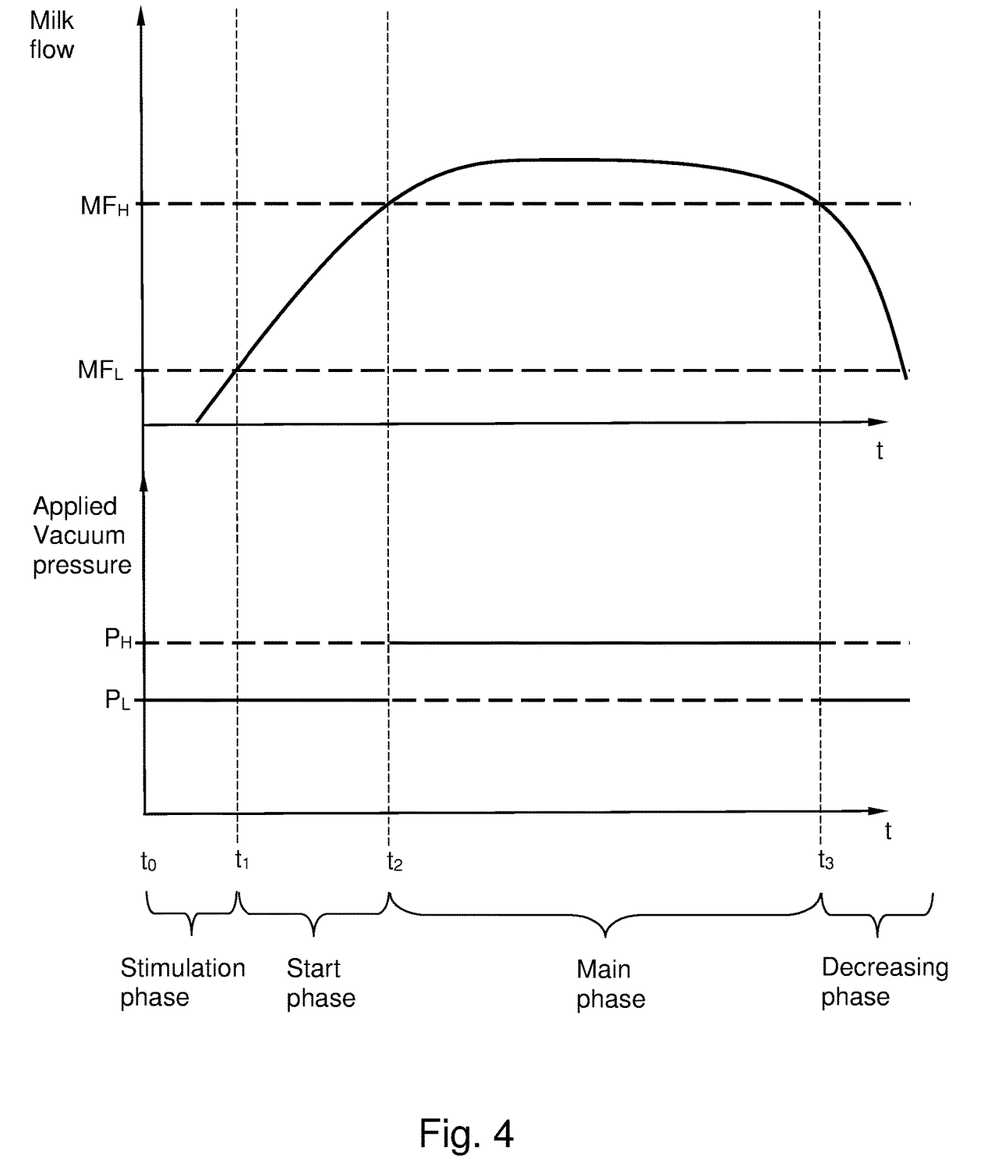
FIG. 4 is a diagram that illustrates an example of milk flow rate and vacuum pressure level during milk extraction in a milking session.

FIG. 4 illustrates milk flow of an animal 200 on the upper part of the illustration, and vacuum pressure applied to the teats 210a, 210b on the lower part of the illustration.

The milk flow according to the milk curve may have very different shape/size, both for different teats 210a, 210b and for different animals 200, the illustrated milk curve is merely an arbitrary example of the milk flow from an animal 200 at an udder level, i.e. the combined milk flow from all four teats.

The milking session may start at origo. Cistern milk may be extracted from the animal 200 immediately when the teat cups 131a, 131b, 131c, 131d have been attached to the teats 210a, 210b.

As the milk flow is lower than the low milk flow limit $MF_L$, the processing device 190 is controlling the pulsator 150 to apply the low pulsation rate and the first pulsation ratio, wherein the D-phase is longer than the B-phase. This may be referred to as the stimulation phase.

When the milk flow increases, the milk flow may reach and exceed the low milk flow limit $MF_L$. The processing device 190 may then control the pulsator 150 to apply the high pulsation rate and the second pulsation ratio, wherein the B-phase is longer than the D-phase. This may be referred to as the start phase.

At the point in time $t_2$, the milk flow is exceeding the high milk flow limit $MF_H$, a vacuum pressure at a high vacuum level $P_H$ may be applied to the milk conduit 140, thereby further ameliorating a time efficient milk evacuation when the milk flow is high. This may be referred to as the main phase. Here, it is indeed alveoli milk that is extracted.

After some time, at the point in time $t_3$, the milk flow starts to decrease below the high milk flow limit $MF_H$. The vacuum pressure may then be decreased to a low vacuum level $P_L$. This may be referred to as the decreasing phase.

Finally, when the milk flow is low and is approaching or is lower than the low milk flow limit $MF_L$, the applied vacuum pressure may be further decreased during a take-off phase, when the teat cups 131a, 131b, 131c, 131d of the milking unit 130 are removed from the teats 210a, 210b and the animal 200 is allowed to leave the milking parlour/rotary platform 310.

It is desired to extract the milk of the animal 200 efficiently, during as short time as possible (to allow for more animals per time unit to be served by the milking system 100), without harming or hurting the teats 210a, 210b by applying an excessive vacuum level under the teat.

Thanks to the disclosed concept, a methodology has been developed towards an efficient teat stimulation which is labour saving, promoting efficient milking, yet conserving teat integrity. Thus, the milk extraction can be made more efficient than according to previously known methods.

The terminology used in the description of the embodiments as illustrated in the accompanying drawings is not intended to be limiting of the described milking system 100; processing device 190 and/or computer program. Various changes, substitutions and/or alterations may be made, without departing from invention embodiments as defined by the appended claims.

The various illustrated embodiments depicted in FIGS. 1-4, and/or discussed in the corresponding respective section of the description may with advantage be combined with each other, for example by mixing and compiling features of some or all of the described embodiments, thereby achieving additional advantages.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g., a processor may fulfil the functions of several items recited in the claims. The mere fact that certain measures or features are recited in mutually different dependent claims, illustrated in different figures or discussed in conjunction with different embodiments does not indicate that a combination of these measures or features cannot be used to advantage.

The invention claimed is:

1. A milking system (100), comprising:
   a milk line (110);
   a vacuum arrangement (161) comprising a vacuum pump (162);
   a milking unit (130) comprising a plurality of teat cups (131a, 131b, 131c, 131d), each configured to fit on a respective teat (210a, 210b) of an animal (200) during milk extraction in a milking session, wherein the milking unit (130) is connected to the milk line (110) via a milk conduit (140), and wherein each said teat cup (131a, 131b, 131c, 131d) comprises a respective liner (220a, 220b) and a shell (230a, 230b), forming a pulsation space (225) between the liner (220a, 220b) and the shell (230a, 230b);
   an electronically controlled pulsator (150), configured to adjust a pulsation ratio and a pulsation rate of fluid pressure at two distinct levels, alternatively provided to the respective pulsation space (225) of each said teat cup (131a, 131b, 131c, 131d) of the milking unit (130), thereby causing the respective liner (220a, 220b) to alternate between:
      a B-phase wherein the liner (220a, 220b) is opened, and milk may be extracted from the teat (210a, 210b) during the milking session, and
      a D-phase wherein the liner (220a, 220b) is collapsed and is acting compressively against the teat (210a, 210b);
   a receiver (160) in which a system vacuum ($P_s$) prevails, connected to the milk line (110), and also connected to the vacuum arrangement (161);
   a milk meter (170) arranged in the milk conduit (140) between the milking unit (130) and the milk line (110), wherein the milk meter (170) is configured to measure the milk flow per time unit of milk ejected from the animal (200) via the milking unit (130) during the milking session;
   a controllable valve (120), arranged in the milk conduit (140), connected to the milking unit (130) via the milk conduit (140), and to the milk line (110), wherein the controllable valve (120) comprises an adjustable passage (122) wherein fluid pressure of the milk line (110) is provided to the milk conduit (140) via the adjustable passage (122); and wherein an adjustment of the adjustable passage (122) results in an adjustment of the fluid pressure upstream the controllable valve (120); and
   a processing device (190) communicatively connected to the milk meter (170), the controllable valve (120), and the electronically controlled pulsator (150), wherein the processing device (190) is configured to, repeatedly during the milking session:
   obtain a milk flow measurement from the milk meter (170);
   compare the obtained milk flow measurement with a low milk flow limit ($MF_L$); and,
   when the obtained milk flow measurement is lower than the low milk flow limit ($MF_L$):
      generate a command to the pulsator (150) to apply a low said pulsation rate; and
      generate a command to the pulsator (150) to apply a first said pulsation ratio, wherein the D-phase is longer than the B-phase;
   when the obtained milk flow measurement exceeds the low milk flow limit ($MF_L$):
      generate a command to the pulsator (150) to apply a high said pulsation rate; and
      generate a command to the pulsator (150) to apply a second said pulsation ratio, wherein the B-phase is longer than the D-phase; and
   compare the obtained milk flow measurement to the high milk flow limit ($MF_H$); and
   generate and provide a control signal to the controllable valve (120), to
   when the obtained milk flow measurement is lower than the high milk flow limit ($MF_H$), adjust the adjustable passage (122) in order to provide a fluid pressure at a low vacuum level ($P_L$) upstream of the controllable valve (120), to the milk conduit (140);
   when the obtained milk flow measurement exceeds the high milk flow limit ($MF_H$), adjust the adjustable passage (122) in order to provide a fluid pressure at a high vacuum level (PH) upstream of the controllable valve (120), to the milk conduit (140).

2. The milking system (100) according to claim 1, wherein the processing device (190) is configured to, when the obtained milk flow measurement exceeds the low milk flow limit ($MF_L$) apply a latency period and ensuring that all milk flow measurements obtained during the latency period exceeds the low milk flow limit ($MF_L$) before generating the commands to the pulsator (150) to apply the high pulsation rate and to apply the second pulsation ratio.

3. The milking system (100) according to claim 2, wherein the latency period is about 10-20 seconds.

4. The milking system (100) according to claim 1, wherein the low pulsation rate is in an interval of 40-59 pulsations per minute, and the first pulsation ratio between the B-phase/the D-phase is about 25/75-45/55.

5. The milking system (100) according to claim 1, wherein the high pulsation rate is in an interval of 55-90 pulsations per minute, and the second pulsation ratio between the B-phase/the D-phase is about 55/45-64/36.

6. The milking system (100) according to claim 1, comprising
a vacuum pressure sensor (180), arranged to measure pressure level in the milk conduit (140) upstream of the controllable valve (120).

7. The milking system (100) according to claim 6,
wherein the processing device (190) is communicatively connected to the vacuum pressure sensor (180), and wherein the processing device (190) is configured to obtain a sequence of pressure level measurements from the vacuum pressure sensor (180) during a predetermined time period; and
compare each of the pressure level measurements during the predetermined time period with a pressure threshold limit; and, upon a condition of all of the pressure level measurements during the predetermined time period exceeds the pressure threshold limit:
generate a command to output an alert on an output device (340), related to the milking unit (130).

8. The milking system (100) according to claim 7, wherein the predetermined time period corresponds to an estimated maximum time period the animal (200) may generate a milk flow exceeding the high milk flow limit ($MF_H$).

9. The milking system (100) according to claim 1, wherein the vacuum arrangement (161) comprises:
a high vacuum line (111), wherein the high vacuum level ($P_H$) prevails; and
a low vacuum line (112), wherein the low vacuum level ($P_L$) prevails;
wherein the vacuum arrangement (161) is connected to the controllable valve (120);
and wherein the processing device (190) is configured to:
when the obtained milk flow measurement is lower than the high milk flow limit ($MF_H$), generate and provide a control signal to a regulator (121), to supply fluid pressure of the low vacuum level ($P_L$) from the low vacuum line (112) to a dry side (124) of the controllable valve (120), thereby acting on a flexible membrane (123) which in turn adjusts the adjustable passage (122) of the controllable valve (120), such that fluid pressure at the low vacuum level ($P_L$) is provided upstream of the controllable valve (120) to the milk conduit (140
when the obtained milk flow measurement exceeds the high milk flow limit ($MF_H$), generate and provide a control signal to the regulator (121), to supply fluid pressure of the high vacuum level ($P_H$) from the high vacuum line (111) to the to the dry side (124) of the controllable valve (120), thereby acting on the flexible membrane (123) which in turn adjusts the adjustable passage (122) of the controllable valve (120), such that fluid pressure at the high vacuum level ($P_H$) is provided upstream the controllable valve (120) to the milk conduit (140).

10. The milking system (100) according to claim 1, wherein a third pulsation ratio between the B-phase/the D-phase is about 65/35-70/30.

11. The milking system (100) according to claim 1, further comprising:
a rotary platform (310) comprising a plurality of the milking units (130), each of the milking units being attached to the milk line (110).

12. The milking system (100) according to claim 1, wherein the high vacuum level ($P_H$) is within an interval of 45-55 kPa; and the low vacuum level ($P_L$) is within an interval of 34-44 kPa.

13. The milking system (100) according to claim 1, wherein the low milk flow limit ($MF_L$) is within an interval of about 250-500 g/minute.

14. The milking system (100) according to claim 1, wherein the high milk flow limit ($MF_H$) is within an interval of about 1 000-3 000 g/minute.

15. A milking system (100), comprising:
a milk line (110);
a vacuum arrangement (161) comprising a vacuum pump (162);
a milking unit (130) comprising a plurality of teat cups (131*a*, 131*b*, 131*c*, 131*d*), each configured to fit on a respective teat (210*a*, 210*b*) of an animal (200) during milk extraction in a milking session, wherein the milking unit (130) is connected to the milk line (110) via a milk conduit (140), and wherein each said teat cup (131*a*, 131*b*, 131*c*, 131*d*) comprises a respective liner (220*a*, 220*b*) and a shell (230*a*, 230*b*), forming a pulsation space (225) between the liner (220*a*, 220*b*) and the shell (230*a*, 230*b*);
an electronically controlled pulsator (150), configured to adjust a pulsation ratio and a pulsation rate of fluid pressure at two distinct levels, alternatively provided to the respective pulsation space (225) of each said teat cup (131*a*, 131*b*, 131*c*, 131*d*) of the milking unit (130), thereby causing the respective liner (220*a*, 220*b*) to alternate between:
a B-phase wherein the liner (220*a*, 220*b*) is opened, and milk may be extracted from the teat (210*a*, 210*b*) during the milking session, and
a D-phase wherein the liner (220*a*, 220*b*) is collapsed and is acting compressively against the teat (210*a*, 210*b*);
a receiver (160) in which a system vacuum ($P_s$) prevails, connected to the milk line (110), and also connected to the vacuum arrangement (161);
a milk meter (170) arranged in the milk conduit (140) between the milking unit (130) and the milk line (110), wherein the milk meter (170) is configured to measure the milk flow per time unit of milk ejected from the animal (200) via the milking unit (130) during the milking session; and
a processing device (190) communicatively connected to the milk meter (170) and the electronically controlled pulsator (150), wherein the processing device (190) is configured to, repeatedly during the milking session:
obtain a milk flow measurement from the milk meter (170);
compare the obtained milk flow measurement to a low milk flow limit ($MF_L$) and a high milk flow limit ($MF_H$);
when the obtained milk flow measurement is lower than the low milk flow limit ($MF_L$):
generate a command to the pulsator (150) to apply a low said pulsation rate; and
generate a command to the pulsator (150) to apply a first said pulsation ratio, wherein the D-phase is longer than the B-phase;
when the obtained milk flow measurement exceeds the low milk flow limit ($MF_L$) and is lower than the high milk flow limit ($MF_H$):
generate a command to the pulsator (150) to apply a high said pulsation rate; and
generate a command to the pulsator (150) to apply a second said pulsation ratio, wherein the B-phase is longer than the D-phase; and when the obtained milk flow measurement exceeds the high milk flow limit ($MF_H$):

generate a command to the pulsator (150) to apply a third said pulsation ratio instead of the second pulsation ratio, wherein the B-phase of the third pulsation ratio is longer than the B-phase of the second pulsation ratio.

16. The milking system (100) according to claim 15, wherein the processing device (190) is configured to, when the obtained milk flow measurement exceeds the low milk flow limit ($MF_L$) apply a latency period and ensuring that all milk flow measurements obtained during the latency period exceeds the low milk flow limit ($MF_L$) before generating the commands to the pulsator (150) to apply the high pulsation rate and to apply the second pulsation ratio.

17. The milking system (100) according to claim 16, comprising a vacuum pressure sensor (180), arranged to measure pressure level in the milk conduit (140) upstream of a controllable valve (120) arranged within the milk conduit.

* * * * *